T. SPENCER.
APPARATUS FOR PASTING STORAGE BATTERY GRIDS.
APPLICATION FILED MAR. 22, 1916.

1,292,117.

Patented Jan. 21, 1919.
4 SHEETS—SHEET 1.

INVENTOR.
THOMAS SPENCER
BY Ira J Adams
ATTORNEY

UNITED STATES PATENT OFFICE.

THOMAS SPENCER, OF PHILADELPHIA, PENNSYLVANIA, ASSIGNOR, BY MESNE ASSIGNMENTS, TO NATIONAL CARBON COMPANY, INC., A CORPORATION OF NEW YORK.

APPARATUS FOR PASTING STORAGE-BATTERY GRIDS.

1,292,117.   Specification of Letters Patent.   Patented Jan. 21, 1919.

Application filed March 22, 1916. Serial No. 85,940.

*To all whom it may concern:*

Be it known that I, THOMAS SPENCER, a citizen of the United States, residing at Philadelphia, in the county of Philadelphia and State of Pennsylvania, have invented a certain new and useful Improvement in Apparatus for Pasting Storage - Battery Grids, of which the following is a full, clear, and exact description.

This invention relates to a method and apparatus for applying active materials, in the form of a paste, to a storage battery grid.

In the manufacture of storage batteries of the Faure or Brush type, the positives and negatives are usually made by applying a paste of lead oxids or salts to a lead grid. These pasted grids are subsequently treated to convert one to lead peroxid and the other to spongy lead.

The pasting of the grid is generally done by hand, which consumes considerable time and makes the operation costly. Battery pasting machines have previously been devised, but as far as I am aware these prior types are slow in operation, or have other objections which practically preclude their use.

The object of my invention is to provide a method and apparatus by means of which the paste may be quickly forced into the grid to produce a smooth surface and entirely fill all interstices.

Further objects of my invention will appear in the following description of the apparatus embodying my invention which is illustrated in the accompanying drawings in which:—

Figure 2:
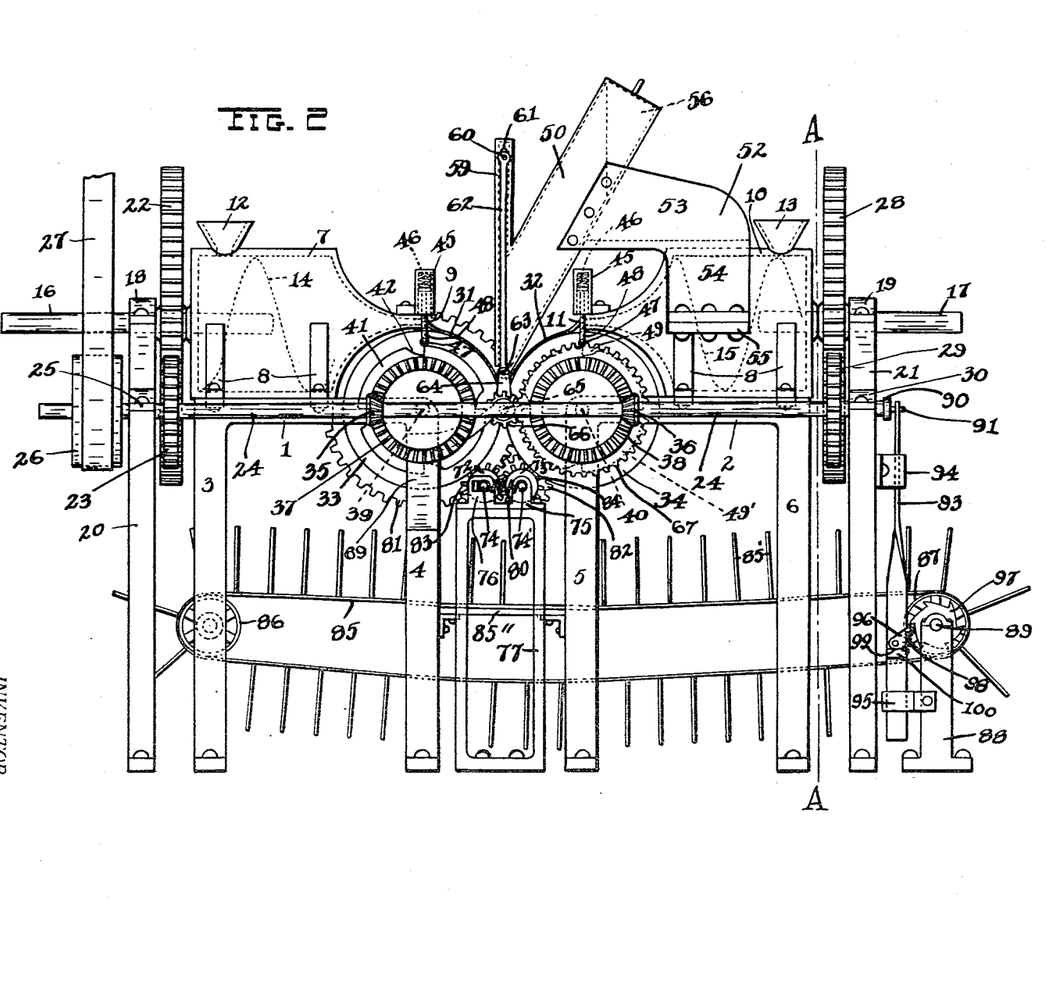
Fig. 2 is a side view taken in the direction of the arrow shown in Fig. 1.
Figure 3:
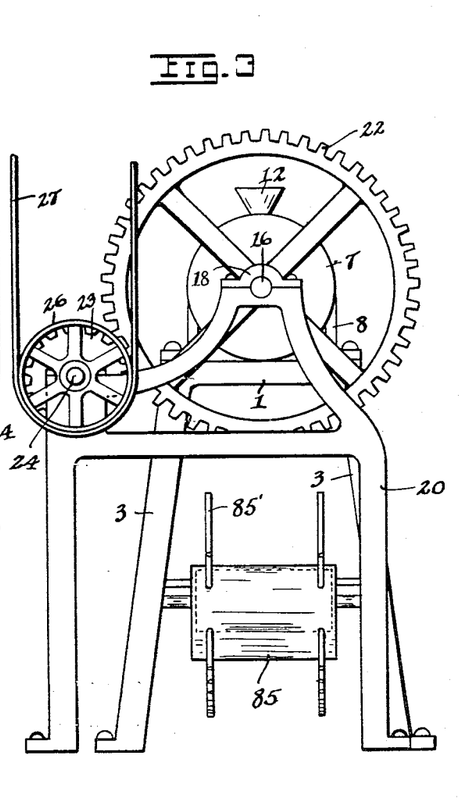
Fig. 3 is an end view taken from the left of Fig. 1.

As best shown in Fig. 2, the principal supporting members consist of two platforms 1, 2 having legs 3, 4, 5 and 6. A cylinder 7 is fastened to the platform 1 by suitable means, such as the projections 8 placed on both sides of the cylinder and bolted to the platform 1. The end of the cylinder is flattened out to form a narrow orifice 9 having its long dimension horizontal and approximately equal to the diameter of the cylinder. Upon the other platform 2 a second cylinder 10 is attached by means of projections 8 in a manner similar to that of the cylinder 7. The cylinder 10 has an orifice 11 of the same size as orifice 9 and placed opposite thereto as shown in Fig. 2.

Material is placed in the cylinders 7 and 10 through hoppers 12 and 13 respectively, and adapted to be forced through the openings 9 and 11 by rotation of suitable feed screws 14 and 15.

The feed screw 14 is carried on a projecting shaft 16, supported in a bearing 18 of standard 20, and feed screw 15 is similarly arranged on shaft 17, supported by bearing 19 and standard 21. The driving mechanism for the screw 14 consists of a large gear 22 having its hub fitted between one side of the standard 20 and the closed end of the cylinder 7 to prevent sidewise movement. A pinion 23 meshes with gear 22 and is fitted on a drive shaft 24 supported in a second bearing 25 of standard 20. Shaft 24 is driven by means of a pulley 26 and belt 27 or through any other suitable mechanism.

The screw 15 of cylinder 10 is driven in a similar manner through a large gear 28 meshing with a pinion gear 29 fastened on the drive shaft 24. A bearing 30 in alinement with bearing 25 of standard 20 is provided in standard 21 to carry the drive shaft 24.

Thin layers 31, 32 of paste which are forced out of the cylinders will be received upon two cylindrical rollers 33, 34 placed under the orifices 9 and 11 respectively. The rollers 33, 34, having shafts 39 and 40 as axes, are driven by bevel pinions 35 and 36 on the drive shaft 24 meshing with bevel gears 37, 38 respectively. In the present instance the diameter of gears 37, 38 is four times that of the pinions 35, 36, so that the ratio of speed of rotation of shafts 39 and 40 to drive shaft 24 is one to four.

Figure 1:
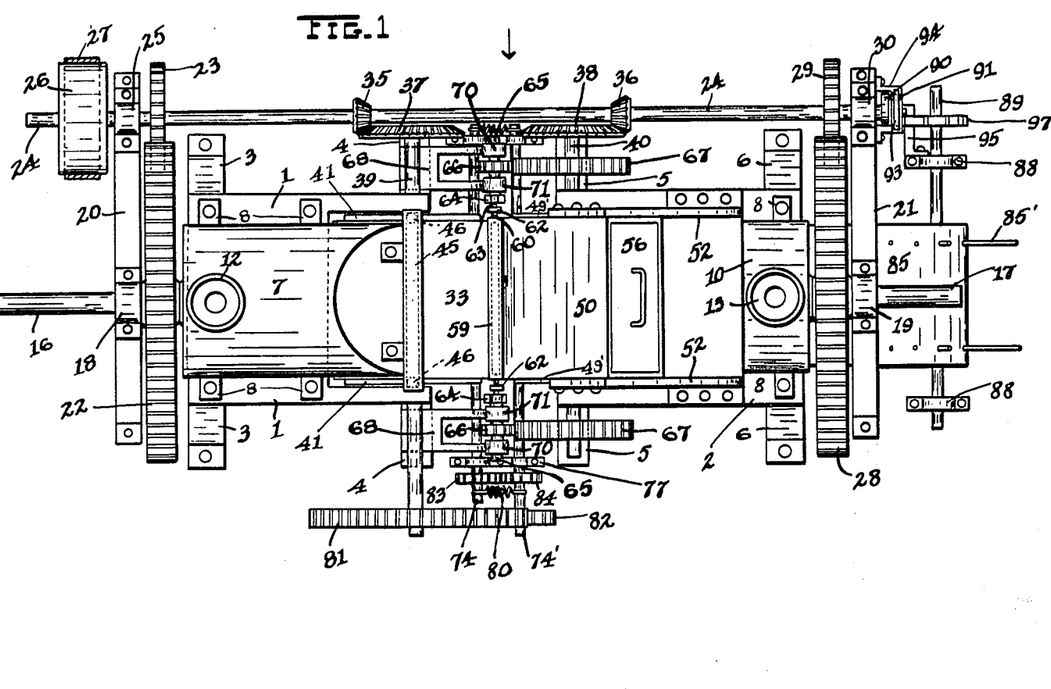
Figure 1 is a plan view of the entire apparatus.

Shaft 39 has suitable bearings in legs 4 of platform 1 and the shaft 40 is supported in a similar manner by the legs 5 of platform 2. Platforms 1 and 2 are recessed as shown in Fig. 1 to permit the rollers 33, 34 to be fitted between the legs and rotated below the orifices. The relation of gears 35, 36 of shaft 24 is such that the rollers rotate in opposite directions and the paste layers 31, 32 issuing from the openings are caused to approach each other.

During one complete revolution of shafts 39 and 40 it is desired to deposit and cut off the paste on the rollers four times. This will be accomplished for roller 33 by cams 41 placed on each end of the roller and attached thereto. The cams are circular throughout the greater part of the circumference and have four depressions 42 spaced 90° apart. The cutting off device coöperating therewith (illustrated in Figs. 2 and 8) consists of a slide 43 attached to a bar 44. The bar 44 is slidably mounted in a casing 45 and adapted to be depressed by springs 46 whenever rollers 47 (Fig. 2) fitted in projecting arms 48, ride in the depressions 42. During the period when the rollers 47 engage the circular portion of the cams the slide is raised and the springs 46 compressed. The cutting off mechanism for cylinder 11 is the same as that of cylinder 9 except that the depressions 49 of the cams 49′ are differently arranged because the cams 49′ rotate in the opposite direction. The remaining parts of the cutting off mechanism of cylinder 10 are the same as those of cylinder 7 and are indicated by the same reference characters.

The mechanism for feeding the grids which pass through the space between the rollers 33, 34, consists of an inclined hopper 50 adapted to receive a plurality of grids 51. The hopper is supported by means of a frame 52 (Fig. 5) having horizontal arms 53 between which the hopper casing 50 is fitted, and perpendicular members 54 which are bolted or otherwise attached to projecting lugs 55 of cylinder 10. The grids are placed in the hopper in a vertical position and maintained in this position by a sliding triangular block 56 (Fig. 6) fitted in the end. The grids are fed through a slot 57 in the lower inclined surface by a slide 58 reciprocating in a guide casing 59 fitted on the lower end of the hopper. Pins 60 fitted in the sides of the slide 58 pass through slots 61 in the sides of the guide casing 59 and are connected by means of connecting rods 62 (Fig. 7) to rotating pins 63. The pins 63 are fitted in crank arms 64 attached to the end of two short countershafts 65 (Fig. 1) arranged on each side of the rollers 33, 34. The countershafts are each driven by gears 66 meshing with gears 67 located on the center shaft 40 of roller 34. The ratio of these gears is one to four, that is, the same as the ratio of bevel gears 35 and 36, to 37 and 38. The short countershafts 65, which carry the gears 66, are supported by brackets 68 fastened to projections 69 (Fig. 5) on the legs 4. Each bracket has two arms 70, 71 which have alined openings therein serving as bearings for the stub shafts 65.

A second set of rollers 72, 73, placed below the large rollers 33, 34, receive the grids after they pass through the intermediate space and are pasted. These further compact the paste in the grid and deposit the grids onto the conveyer below. The shafts 74, 74′ of the rollers 72, 73, are fitted in bearings 75, 76 of standards 77. To permit variation in the distance between the rollers, the bearings 76 of the roller 72 consist of rectangular bearing blocks 78 (Fig. 9), slidable in slots 79 against the action of springs 80 which tend to draw the rollers together. The rotation of the rollers is effected by means of a gear 81 on shaft 39 which meshes with a pinion 82 on the shaft 74′ of roller 73. The sliding roller 72 is driven from roller 73 by means of gears 83, 84 on the shafts 74, 74′ of the rollers. The teeth of these gears are of suitable design to maintain the gears in mesh even when the roller 73 is moved horizontally a slight distance. The peripheral speed of the rollers will be made equal to that of the paste issuing from the pasting cylinders by suitable relations between the diameters of gear 81 and pinion 82. The arrangement of gears is such that the direction of rotation of roller 72 and pasting cylinder 33 is the same and likewise the direction of roller 73 corresponds with that of pasting cylinder 34.

After being drawn through the space between the second set of rollers the grid is deposited on the belt conveyer 85 which is divided into sections by a number of spaced rods 85′ projecting upward. The conveyer moves intermittently around two end pulleys 86, 87. The bearings of the former are conveniently arranged between the legs 3 of the platform 1 and the bearings of the latter are shown as consisting of separate standards 88 for the shaft 89. To prevent too much sagging of the conveyer 85 at the point at which the pasted grids are deposited thereon, a platform 85″ is arranged below this point, the same being preferably fastened between the legs 4 and 5.

The mechanism for producing intermittent motion of the conveyer (Fig. 4) is operated by means of a crank 90 on the end of shaft 24. A crank pin 91 attached to the crank moves in a slot 92 of arm 93 which is maintained in a vertical position by means of an upper guide 94 which is attached to standard 21 and a lower guide 95 attached to standard 88. A dog 96 is pivoted to arm 93 in position to engage a ratchet wheel 97 keyed to the shaft 89. To maintain the dog in engagement with the teeth of the ratchet wheel, a spring 98 is used which draws the lower flat surface 99 of the dog against the stop 100.

Figures 4, 6, 7, 8, 9, 10:
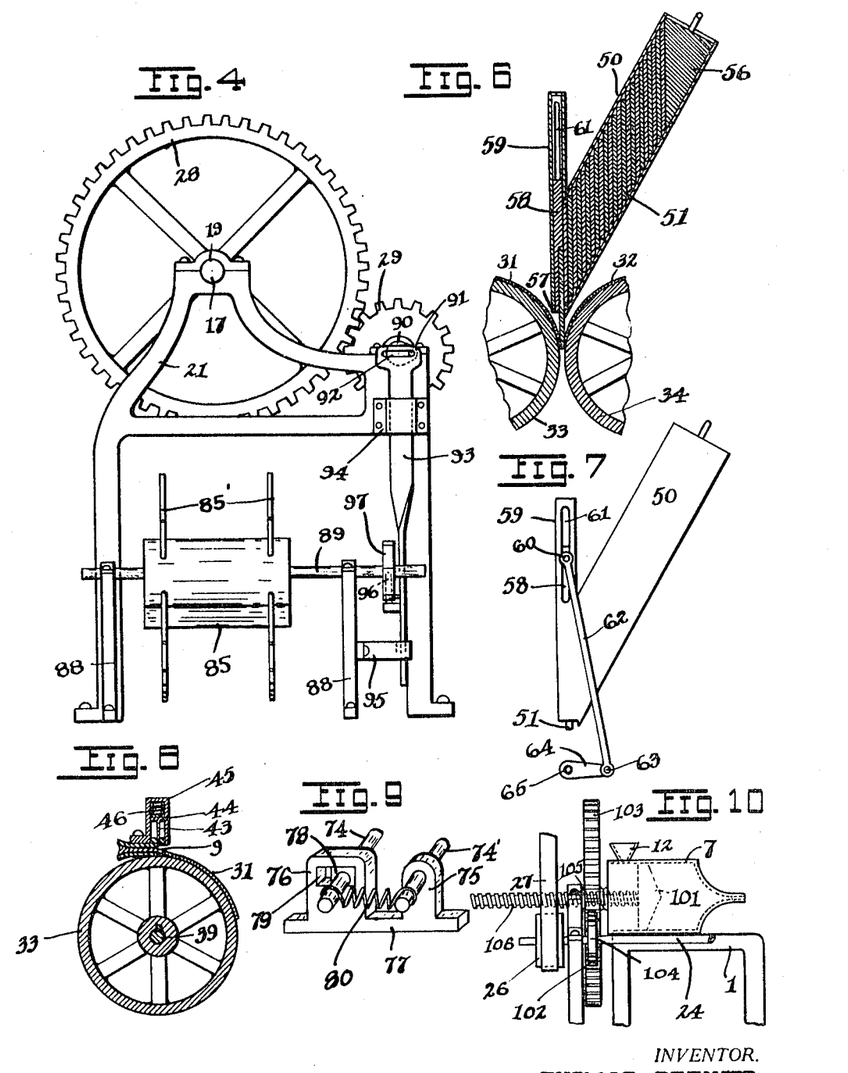
Fig. 4 is a view of the delivery end taken from the right of Fig. 1.
Fig. 6 is a fragmentary sectional view of the hopper for the grids.
Fig. 7 is a fragmentary view illustrating the method of feeding the grids.
Fig. 8 is a fragmentary section illustrating the means for cutting off the paste.
Fig. 9 is an enlarged fragmentary view of certain details of the apparatus.
Fig. 10 is a side view of a part of an apparatus having a modified arrangement for feeding the paste.
Figure 5:
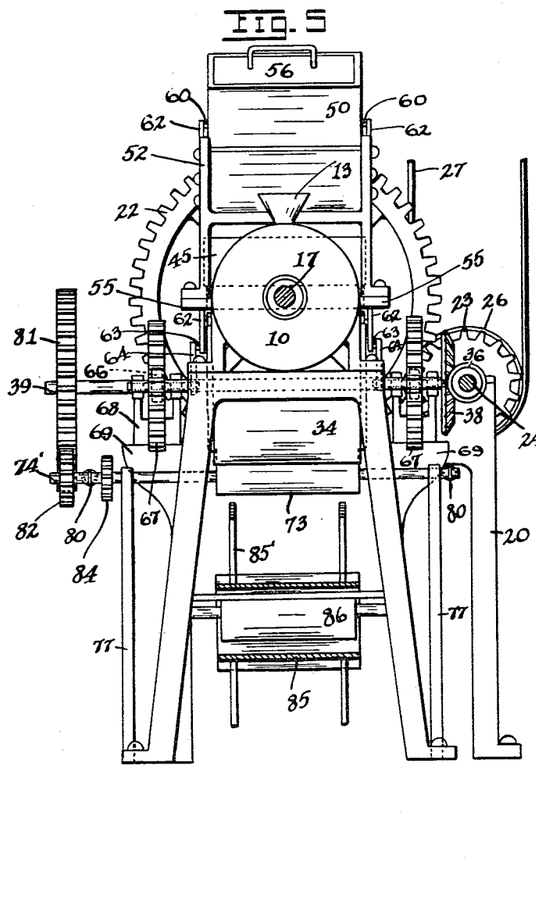
Fig. 5 is a cross section on the line A—A of Fig. 2 looking toward the left.

The modification of Fig. 10 illustrates a different manner of feeding the paste forward. The cylinder 7 is fitted with a piston 101 which is moved forward by an arrangement consisting of a pinion 102 on shaft 24 meshing with a large feed gear 103. Pinion 102 is mutilated at 104 to temporarily stop the feeding of the paste. The feed gear 103 has an internally threaded hub 105 which fits on a threaded feed rod 106. This gear is held between standard 18 and the end of cylinder 7 to prevent sideward movement. The other cylinder 10 is similarly arranged, but the piston is moved in the opposite direction by suitable means, as for example by providing one feed rod with a left-handed and the other with a right-handed thread. The grid feeding device, the auxiliary rollers, conveyer, paste cut off and other devices of the previous modification are not shown but all may be used with this modification.

The operation of the apparatus will be as follows:—After a suitable number of grids 51 have been fitted in the hopper 50, the weight 56 will be inserted in the upper end to maintain all of the grids in a vertical position and to provide ample force for feeding them forward. The paste will be added from time to time to the cylinders 7 and 10 through the hoppers 12, 13, so that it is not necessary to stop the machine. However, with the arrangement shown in Fig. 10 it will be necessary to stop the machine and draw back the pistons to refill the cylinder. In this form, by means of the mutilated drive gear 102 and feed gear 103 the pressure will be applied only during the actual time that it is desired to feed the paste, while with the screw conveyer feed type the feed of the paste is not absolutely positive and it is therefore unnecessary to stop the feed while the orifice is closed. With this slight variation the operation of the two forms is alike.

In the arrangements shown all of the moving members are operated from the shaft 24. The paste is forced out of openings 9 and 11 by rotation of the screw conveyers 14 and 15, by means of the gear mechanism previously set forth, onto the pasting cylinders 33, 34. The pasting cylinders 33, 34 will be driven continuously through the bevel gears 35, 36, 37, 38. While the paste deposited on the cylinders is approaching the central space therebetween, a grid 51 will be fed from the hopper 50. This will be accomplished by one revolution of the countershafts 65 driven by gears 66, 67 which turns the crank arms 64 through one revolution and produces a reciprocating movement of slide 58 by the movement of the connecting rods 62. The rotative speed of the grid feed stub shafts 65 is the same as that of the drive shaft 24, although for convenience of construction the stub shafts are driven at four times the speed of the shaft 40 which is in turn driven through bevel gears 36, 38 at only one-fourth the speed of drive shaft 24.

The slide 58 is so timed with the paste feed that the forward edges of the paste layers 31, 32 meet the grid 50 at a point slightly above the line of centers of the rollers 33, 34. If the rim of the grid is of any considerable width the end of the grid will be slightly ahead of the edge approaching paste to prevent the paste being applied to the rim. As the layers 31, 32 of paste, and the grid, come together, the paste will be forced into the interstices of the grid and the latter will be drawn from the hopper by the pasting rollers. The slide 58 will then be raised. The weight of the grids in the hopper 50 is sufficient to retain the grid after being fed by the slide, but not enough to prevent the rollers from readily withdrawing it. The slide 58 will not engage the next grid to feed it downward until the top of the grid being pasted is somewhat below the bottom of the next grid to be fed forward.

When sufficient amount of paste has been forced through the orifices 9 and 11, they will be closed and the paste thus cut off. This will occur for cylinder 33 when the roller 47 reaches one of the recesses 42 of the cam surface 41, and simultaneously for cylinder 34 when roller 47 reaches one of the recesses 49' of cam 49. This permits the knife or slide 43 to be depressed by the springs 46. The period during which the flow of paste is stopped is determined by the length of the recesses 42 and 49', and need only be of short duration. For purposes of construction it is preferable to have four portions of paste deposited on the pasting rolls during one revolution, but this spacing could of course be varied. Four grids will therefore be fed and pasted while the paste rollers 33, 34 make one revolution.

As the grid is drawn through the rollers the paste will be forced into the grid openings on each side and before entirely leaving the pasting rolls will be deposited between the second set of rollers 72, 73 of smaller diameter. These will serve to further press the paste into the grid and smooth the surface. In addition, they will serve to prevent the pasted grid from falling onto the conveyer as soon as it passes between the main rollers. These smaller rollers 72, 73 will be positively rotated with a surface speed equal to that of the larger rolls, to draw the grids therethrough at a speed equal to the speed at which the grids pass through the latter. The spring pressure on the small rollers 72, 73 provides sufficient force to retain the grids until they are rolled entirely through, when the grid is deposited on the belt 85 between the projecting pins 85′. As soon as the grid is deposited on the conveyer it will be moved along by the ratchet mechanism to make room for the next grid.

During each revolution of the shaft 24 the crank 90 will raise the arm 93 and dog 96 and thus turn the ratchet 97 and pulley 87 through a certain angle and the belt 85 through a distance equal to the space between the projecting pins 85′. The pasted grids will be removed just before reaching the pulley 87 and will then be ready for further treatment.

Although I have shown and described a satisfactory form of gear drive, it will be understood that other types of drive might be used.

The paste fed into the cylinder may consist of the usual ingredients, such as red lead or litharge together with a binder, or spongy lead or lead peroxid may be pasted directly into the grid so that "forming" will be unnecessary. The paste is ordinarily of the consistency of putty, but it may be made of any desired degree of plasticity.

Having described my invention, what I claim is:—

1. In apparatus for pasting a storage battery grid, a paste chamber having an outlet opening for the paste, a paste carrier for receiving said paste, and means whereby said carrier is caused to force the paste into a grid.

2. In apparatus for pasting a storage battery grid, a paste chamber having an opening, a paste carrier for receiving the paste, means for forcing said paste through said opening onto the carrier, and means whereby said carrier is caused to force the paste into a grid.

3. In apparatus for pasting storage battery grids, a paste chamber having an opening, a paste carrier for receiving the paste, means for forcing said paste through said opening onto the carrier, and means for moving the grids adjacent the paste carrier.

4. In apparatus for pasting storage battery grids, a paste chamber having a linear opening, means for forcing a sheet of paste through said opening, a paste carrier for receiving the paste, and means for passing the grids adjacent the paste carrier.

5. In apparatus for pasting storage battery grids, a paste chamber having a linear opening, means for forcing a sheet of paste through said opening, a cylindrical drum for receiving the sheet and means for passing the grids adjacent the surface of the drum.

6. In apparatus for pasting storage battery grids, a paste chamber having a linear opening, means for forcing a sheet of paste from said opening, a cylindrical drum for receiving the sheet, means for closing said opening to sever a sheet of the desired length, and means for passing a grid adjacent said sheet.

7. In apparatus for pasting storage battery grids, a paste chamber having a linear opening of substantially the same length as the width of the grids, means for forcing a sheet of paste from said opening, a cylindrical drum for receiving the sheet, means for closing the opening to sever a section of paste of substantially the same length as the grid, and means for passing a grid adjacent said sheet of paste.

8. In apparatus for pasting storage battery grids, a paste chamber having a horizontal linear opening of substantially the same length as the width of the grids, means for forcing a sheet of paste from said opening, a cylindrical drum below said opening for receiving the sheet issuing therefrom, means for closing the opening to sever a section of paste of substantially the same length as the grid, and means for passing a grid adjacent said sheet of paste.

9. In apparatus for pasting storage battery grids, a paste chamber having a horizontal linear opening of substantially the same length as the width of the grids, a screw conveyer for forcing a sheet of paste from said opening, a cylindrical drum below the opening for receiving the sheet of paste issuing therefrom, means for closing the opening to sever a section of paste of substantially the same length as the grid, and means for passing the grid adjacent said sheet of paste.

10. In apparatus for pasting storage battery grids, a paste chamber having a horizontal linear opening of substantially the same length as the width of the grids, means for forcing a sheet of paste from the opening, a cylindrical drum for receiving the sheet, means for closing the opening to sever a section of paste of substantially the same length as the grid, and a vertical guide for passing a grid adjacent the drum.

11. In apparatus for pasting a storage battery grid, a paste chamber having a horizontal linear opening of substantially the same length as the width of the grids, means for forcing a sheet of paste from said opening, a cylindrical drum for receiving the sheet, means for closing the opening to sever a section of paste of substantially the same length as the grid, a guide for passing the grids adjacent the drum and a conveyer for receiving the pasted grids adapted to hold the grids in a substantially upright position.

12. In apparatus for pasting storage battery grids, a hopper for the grids, a paste chamber having an opening, a paste carrier for receiving the paste, means for forcing paste through said opening onto the carrier, means for feeding grids from said hopper and means whereby said carrier is caused to force the paste into the grids.

13. In apparatus for pasting storage battery grids, a hopper for the grids, a paste chamber having a linear opening, means for forcing a sheet of paste through said opening, a cylindrical drum for receiving the sheet, means for feeding the grids from said hopper and means for passing the grids adjacent the surface of the drum.

14. In apparatus for pasting storage battery grids, a hopper for the grids, a paste chamber having a linear opening, means for forcing a sheet of paste from said opening, a cylindrical drum for receiving the sheet, means for closing said opening at various times to sever a plurality of sheets of the desired length, and means for feeding a grid from said hopper whereby a grid passes adjacent the drum in contact with a sheet of paste.

15. In apparatus for pasting storage battery grids, a paste chamber having a linear opening of substantially the same length as the width of the grids, means for forcing a sheet of paste from the opening, a cylindrical drum for receiving the paste, means for closing the opening at various intervals to divide the paste into a plurality of sections of substantially the same length as the grid and means for passing a grid adjacent each of said paste sections.

16. In apparatus for pasting storage battery grids, a hopper for the grids, a paste chamber having a linear opening of substantially the same length as the width of the grids, means for forcing a sheet of paste from the opening, a cylindrical drum for receiving the paste, means for closing the opening at regular intervals to divide the paste into a plurality of sections of substantially the same length as the grids, and means for feeding the grids from said hopper adjacent the drum, whereby the corresponding sections of the paste and grid successively coincide.

17. In apparatus for pasting storage battery grids, a hopper for the grids, a paste chamber having a linear opening of substantially the same length as the width of the grids, means for forcing a sheet of paste from the opening, a cylindrical drum below said opening for receiving the paste, means for rotating said drum, means for closing the opening at regular intervals to divide the paste into a plurality of sections of substantially the same length as the grids, a guideway for carrying the grids to a point adjacent said drum and paste thereon, and means for feeding the grids from said hopper whereby the front edge of the grids and sections of paste successively coincide.

18. In apparatus for pasting storage battery grids, a hopper for the grids, a paste chamber having a linear opening of substantially the same length as the width of the grids, means for forcing a sheet of paste from the opening, a cylindrical drum having its axis directly below and parallel with said opening, means for continuously rotating said drum, means for closing the opening at regular intervals to divide the paste into a plurality of equal sheets of substantially the same length as the grids, a guideway substantially tangent to the drum for carrying the grids to a point adjacent said drum, means for feeding the grids from said hopper whereby the front edges of the grids and sections of paste coincide successively and means for moving the grids past the drum at approximately the same speed as the peripheral speed of the drum.

19. In apparatus for pasting storage battery grids, a paste chamber having a linear opening, a screw conveyer for forcing a sheet of paste through said opening, a paste carrier for receiving the sheet and means for passing the grids adjacent said paste carrier.

20. In apparatus for pasting storage battery grids, a paste chamber having a linear opening, a second paste chamber having a linear opening, means for forcing a sheet of paste from each of said openings, a cylindrical drum for receiving paste issuing from said first mentioned opening, a second cylindrical drum for receiving the paste issuing from said second mentioned opening spaced apart from said first mentioned cylinder a distance approximately equal to the thickness of the grids, and means for passing the grids between the drums.

21. In apparatus for pasting storage battery grids, a paste chamber having a linear opening, a second paste chamber having a linear opening parallel to said first mentioned opening, means for forcing a sheet of paste from each of the openings, a cylindrical drum for receiving the paste issuing from the first mentioned opening, a second cylindrical drum for receiving the paste from the second opening spaced apart from said first mentioned drum a distance approximately equal to the thickness of the grids, means for rotating the drums whereby the paste layers approach each other, and means for passing the grids and paste layers simultaneously between the drums.

22. In apparatus for pasting storage battery grids, a paste chamber having a horizontal linear opening, a second paste chamber having a horizontal linear opening parallel to the first mentioned opening, means for forcing a thin layer of paste from each of said openings, a cylindrical drum having its axis in a horizontal position for receiving the paste issuing from the first mentioned opening, a second drum having its axis in a horizontal position for receiving paste from the second opening spaced apart from said first mentioned drum a distance approximately equal to the thickness of the grids, means for rotating the drums whereby the paste layers approach each other, and means for passing the grids between the drums.

23. In apparatus for pasting storage battery grids, a pair of rollers, means for depositing paste on a roller, means for depositing a grid between said rollers and means for rotating the rollers to apply the paste to said grid.

24. In apparatus for pasting storage battery grids, a pair of rollers spaced apart a distance substantially equal to the thickness of the grids, means for depositing paste on a roller, means for depositing a grid between said rollers and means for rotating the rollers at substantially the same peripheral speed.

25. In apparatus for pasting a storage battery grid, a pair of rollers spaced apart a distance substantially equal to the thickness of the grid, means for depositing paste on a roller, means for rotating the rollers in opposite directions at substantially the same peripheral speed and means for feeding a grid between said rollers whereby it is drawn therethrough.

26. In apparatus for pasting storage battery grids, a pair of rollers spaced apart a distance substantially equal to the thickness of the grids, a paste carrier having a linear opening for depositing paste on a roller, means for rotating the rollers in opposite directions, a hopper for the grids and means for removing the grids from the hopper and depositing them between said rollers.

27. In apparatus for pasting storage battery grids, a pair spaced rollers of substantially the same diameter, paste carriers having linear openings for depositing paste on the rollers, means for rotating the rollers in opposite directions, a hopper for the grids and a reciprocating slide for removing the grids from the hopper and depositing them between the rollers.

28. In apparatus for pasting storage battery grids, a pair of spaced rollers of equal diameter, a pair of paste carriers having openings for depositing paste on the rollers, means for rotating the rollers in opposite directions, means for closing the openings at predetermined intervals, a hopper for the grids and a reciprocating slide for removing the grids and depositing them between the rollers.

29. In apparatus for pasting storage battery grids, a pair of spaced rollers of equal diameter, a pair of paste carriers having linear openings, means for forcing paste from the openings onto the rollers, means for continuously rotating the rollers in opposite directions, blades for closing the openings at predetermined intervals, to divide the paste into a plurality of sections, a hopper for the grids and a reciprocating slide for removing the grids and depositing them between the rollers and paste sections.

30. In apparatus for pasting storage battery grids, a pair of spaced rollers of equal diameter, a pair of paste carriers each having a linear opening, screw conveyers for forcing paste from the openings onto the rollers, means for continuously rotating the rollers in opposite directions, a pair of blades, means for operating said blades to simultaneously close the openings to sever sections of paste, an inclined hopper adapted to carry the grids in a vertical position, a reciprocating slide for removing the grids and means for operating the slide to feed a grid between said rollers and paste sections.

31. In apparatus for pasting storage battery grids, a pair of spaced rollers of equal diameter, a pair of paste carriers each having a linear opening of substantially the same width as the grids, screw conveyers for forcing paste from the openings onto the rollers, means for rotating the rollers in opposite directions, a pair of blades, cams for simultaneously operating said blades to close the openings to deposit a plurality of sections on the rollers during one revolution, a hopper adapted to carry the grids in a vertical position, and a reciprocating slide for feeding a plurality of grids from the hopper into the space between the rollers during one revolution of said rollers.

32. In apparatus for pasting storage battery grids, a pair of rollers, means for applying paste to a roller, means for depositing a grid between said rollers, means for rotating the rollers to apply paste to said grid and means adapted to smooth the pasted surface.

33. In apparatus for pasting storage battery grids, a pair of paste carriers, means for applying paste to a carrier, means for depositing a grid between said carriers, means for moving the carriers to apply paste to said grid, and a pair of rollers for receiving the pasted grids therebetween.

34. In apparatus for pasting storage battery grids, a pair of drums, means for applying paste to a drum, means for depositing a grid between said drums, means for rotating the drums to apply paste to said grid, a pair of rollers for receiving the pasted grids, means for rotating the rollers and means for drawing the rollers toward each other.

35. In apparatus for pasting storage battery grids, a pair of drums, means for applying paste to a drum, means for depositing a grid between said drums, means for rotating the drums to apply paste to said grid, means adapted to smooth the pasted surface, a pair of spaced rollers below said first mentioned pair adapted to receive the pasted grids, means for rotating said second pair of rollers at substantially the same peripheral speed as the peripheral speed of the first mentioned pair, a pair of springs for drawing the second pair of rollers together and a conveyer for removing the grids.

In testimony whereof, I hereunto affix my signature.

THOMAS SPENCER.